3,567,421
TREATMENT OF MUNG BEAN SEEDS
Dale H. Pape and William E. Neel, Archbold, Ohio, assignors to Beatrice Foods Co., Chicago, Ill.
No Drawing. Filed Mar. 14, 1969, Ser. No. 807,420
Int. Cl. A01n 21/02
U.S. Cl. 71—76       10 Claims

ABSTRACT OF THE DISCLOSURE

Legume seeds, preferably mung bean seeds, are soaked with a mixture of p-chlorophenoxyacetic acid and α,α,α-trifluoro - 2,6 - dinitro-N,N-dipropyl-p-toluidine (trifluralin). The use of trifluralin increases the yield of sprouts and gives shorter, fatter sprouts. The addition of p-chlorophenoxyacetic acid curbs the growth of undesired root hairs.

---

The present invention relates to the sprouting of legumes, specifically mung bean seeds.

It is an object of the present invention to increase the yield of mung bean sprouts.

Another object is to prepare shorter fatter mung bean seeds.

An additional object is to prepare bean sprouts with greater resistance to extremes of temperature.

Yet another object is to prepare crisper mung bean sprouts.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by sprouting mung bean seeds (Phaseolus aureus seeds) in the presence of small amounts of α,α,α-trifluoro-2,6-dinitro-N,N-dipropyl-p-toluidine (trifluralin). Preferably there is also employed p-chlorophenoxyacetic acid. The combination of trifluralin p-chlorophenoxyacetic acid is critical since although some 15 to 20 other combinations of herbicides were tested none works as effectively as the use of trifluralin and p-chlorophenoxyacetic acid. Thus when 2,4-dichlorophenoxyacetic acid was substituted for p-chlorophenoxyacetic acid the sprouts were long and rooty and dosages of 100 to 1000 p.p.m. (based on the seeds). Similarity aminotriazole was ineffective.

Stoller Pat. 2,522,409 discloses the use of 0.1 to 200 mg. per liter of phenoxyaliphatic acids in developing rootless sprouts of mung bean seeds. However, the process of the present invention has several advantages over the Stoller procedure. Thus the mung bean sprouts are obtained in improved yields per pound of seed. Thus increased yields of approximately 15% are obtained by employing trifluralin. The use of trifluralin furthermore gives a flavor improvement. The trifluralin treated sprouts are somewhat sweeter and have a stronger flavor than sprouts treated merely with p-chlorophenoxyacetic acid. The trifluralin treated sprouts are crisper and have a greater tendency to retain the original shape and texture than conventional untreated sprouts. They are much more resistant to the extreme temperatures involved in freezing and cooking than conventional mung bean sprouts. This is of greatest importance in the use of the sprouts in frozen Chinese foods.

The most outstanding improvement in the mung bean seeds as a result of the treatment with trifluralin is that the sprouts are much shorter and fatter than conventional sprouts. This has the advantage that the shorter, plumper sprouts can be cooked in an agitated type of process without excessive tangling.

The use of trifluralin alone does not eliminate the root hairs from the sprouts. However, by the addition of p-chlorophenoxyacetic acid the root hairs are eliminated.

The trifluralin is preferably employed in an amount of 10 to 160 p.p.m. of the water in which the seeds are soaked, usually from 11.1 to 154.5 p.p.m. Based on the amount of seed there is employed about 2.2 to 30.9 ounces per 3000 to 3500 pounds of seed. The p-chlorophenoxyacetic acid can be used as indicated in Stoller at a rate of 0.1 to 200 mg. per liter of the soak water but usually is used in an amount of 7 to 11 grams per 1,500 gallons of water or per 3000 to 3500 pounds of seed.

Sprouting can be accomplished at conventional temperature, e.g., 50 to 120° F. although temperatures of 80 to 110° F. are usually employed, preferably 98° F. The soaking can be for a few minutes to 24 hours but usually is 4.5 to 8 hours.

Unless otherwise indicated all parts and percentages are by weight.

While p-chlorophenoxyacetic acid is used in the examples it will be understood that its water soluble salts, e.g., sodium salt, potassium salt, amine salts, e.g., ethanolamine salt, butylamine salt, methylamine salt, octylamine salt and the like can be used as is conventional in the herbicide art.

While the trifluralin with or without the p-chlorophenoxyacetic acid is normally added to the soak water it can also be applied in the rinse water after soaking or in the sprinkling water after the seeds are sown.

EXAMPLE 1

A soaking tank was filled with water, 1500 gallons, at 98° F. and agitation was begun and maintained. 3000 pounds of mung bean seed were placed in the tank. The water was drained and refilled with fresh water at 98° F. to six inches above the level of the seeds. One and one-half gallons of formaldehyde (37% formalia) and 6 pounds of trisodium phosphate were added. Agitation was continued and the mixture held for 1 hour. (In other experiments treatment time of 30 minutes to 2 hours was employed.) The tank was drained and filled with fresh water at 98° F. Then there were added 9 grams of p-chlorophenoxyacetic acid and 6.2 ounces (about 175 grams). Trifluralin agitation was continued and soaking for 7 hours. (In other experiments soaking time of 4 to 10 hours was employed.) The tank was drained and rinsed again. The seeds were then sown in water and allowed to sprout in conventional fashion. There were obtained mung bean sprouts having all the advantages previously set forth.

EXAMPLE 2

The process of Example 1 was repeated using 3500 pounds of seed. The mung bean sprouts obtained were of the same quality. They were much shorter and plumper than conventional mung bean sprouts and were obtained in an increased yield of about 15%. Normal yield is 7.16 pounds of sprouts per pound of seed but with the use of Trifluralin the yield is about 8.25 pounds of sprouts.

EXAMPLE 3

31 p.p.m. of trifluralin and 1.6 p.p.m. of p-chlorophenoxyacetic acid were added to 1000 gallons of water. 3000 pounds of mung bean seeds were soaked for 6.5 hours in this solution. (The time can vary from 5 to 8 hours depending on the imbibing quality of the beans being treated.) The seeds were then sprouted and processed by normal commercial methods.

EXAMPLE 4

15 ml. of Treflan E.C. (an approximately 45% solution of trifluralin in xylene) and 0.22 gram of p-chlorophenoxyacetic acid were added to 38 gallons of water and 50 pounds of mung bean seeds soaked therein. The treated seeds were then sprouted in water in conventional fashion and harvested 8 days later. Good short, fat sprouts were obtained in a yield of 9 pounds per pound of seed. The sprouts were then frozen.

EXAMPLE 5

The process of Example 4 was repeated using 25 ml. of Treflan E.C. in place of 15 ml. thereof. A similar yield of good short, fat bean sprouts was obtained.

EXAMPLE 6

50 pounds of mung bean sprouts were soaked in 38 gallons of water containing 10 ml. of Treflan E.C. and 0.22 gram of p-chlorophenoxyacetic acid. The seeds were then sown in water, sprouted and the sprouts harvested in 8 days.

EXAMPLE 7

The procedure of Example 6 was repeated but the amount of p-chlorophenoxyacetic acid was reduced to 0.182 gram.

EXAMPLE 8

50 pounds of mung bean seeds were soaked in 38 gallons of water containing 15 ml. of Treflan E.C. The seeds were then sprouted in water in conventional fashion and harvested. The sprouts had stunted growth, i.e., they were short and fat although there were hair roots.

Similar results were obtained when the amount of Treflan E.C. was increased to 50 ml.

EXAMPLE 9

(a) 50 pounds of mung bean seeds were soaked in 38 gallons of water containing 5 ml. of Treflan E.C. and 0.22 gram of p-chlorophenoxyacetic acid. The sprouted seeds were not as fat as those which had been treated with larger amounts of trifluralin and had some radish ends.

(b) The process of Example 9(a) was repeated but the amount of p-chlorophenoxyacetic acid was reduced to 0.11 gram. The sprouts obtained were not as fat as those treated with larger amounts of trifluralin. No radish ends were observed but the sprouts had slight hair roots, indicating that a slightly larger amount of p-chlorophenoxyacetic acid would be desirable.

EXAMPLE 10

(a) 50 pounds of mung bean seeds were soaked in 38 gallons of water and 7 ml. of Treflan E.C. and 0.22 gram of p-chlorophenoxyacetic acid added. The seeds were sprouted in conventional fashion and harvested after 6 days. The sprouts had some radish ends.

(b) The process of Example 10(a) was repeated using only 0.165 gram of p-chlorophenoxyacetic acid. The sprouts obtained had some hair ends.

EXAMPLE 11

(a) 50 pounds of mung bean seeds were soaked in 38 gallons of water containing 10 ml. of Treflan E.C. and 0.22 gram of p-chlorophenoxyacetic acid. The seeds were sprouted in conventional fashion and harvested in 8 days. The sprouts looked good, had some radish ends and the yield was 9.5 pound per pound of seed.

(b) The process of Example 11(a) was repeated using only 0.182 gram of p-chlorophenoxyacetic acid. The results obtained were similar except that the sprouts were a little rooty and no radish ends were observed.

EXAMPLE 12

(a) 50 pounds of mung bean seeds were soaked in 38 gallons of water containing 4.8 ml. of Treflan E.C. and 0.182 gram of p-chlorophenoxyacetic acid. The seeds were sprouted in conventional fashion and harvested after 7 days. The sprouts looked good and were obtained in a yield of 10.27 pounds per pound of seed.

(b) In another experiment 4.4 ml. of the Treflan E.C. was used with the 0.182 gram of p-chlorophenoxyacetic acid.

(c) In a third experiment 5.2 ml. of Treflan E.C. was used with the 0.182 gram of p-chlorophenoxyacetic acid.

(d) In a fourth experiment 8.0 ml. of Treflan E.C. was used with the 0.182 gram of p-chlorophenoxyacetic acid.

The sprouts harvested after 6 days in Example 12(c) and (d), yielded 8.8 pounds per pound of seed.

EXAMPLE 13

50 pounds of mung bean seeds were soaked in 38 gallons of water containing 20 ml. of Treflan E.C. and 0.165 gram of p-chlorophenoxyacetic acid and harvested after 7 days. The sprouts were stunted on the top and good underneath.

EXAMPLE 14

(a) 50 pounds of mung bean seeds were soaked in 38 gallons of water containing 4.0 ml. of Treflan E.C. and 0.22 gram of p-chlorophenoxyacetic acid.

(b) Example 14(a) was repeated using only 3.6 ml. of Treflan E.C. with the p-chlorophenoxyacetic acid.

The sprouts obtained in Examples 14(a) and (b) were harvested after 7 days in a yield of 10.27 pounds per pound of seed.

EXAMPLE 15

50 pounds of mung bean seeds were soaked in 38 gallons of water containing the following amounts of trifluralin. The p.p.m. are based on the weight of seeds.

(a) 2.26 grams (100 p.p.m.)
(b) 4.53 grams (200 p.p.m.)
(c) 6.79 grams (300 p.p.m.)
(d) 9.06 grams (400 p.p.m.)
(e) 11.32 grams (500 p.p.m.)
(f) 13.58 grams (600 p.p.m.)
(g) 15.84 grams (700 p.p.m.)
(h) 18.10 grams (800 p.p.m.)
(i) 20.36 grams (900 p.p.m.)
(j) 0.34 gram of p-chlorophenoxyacetic acid (control)

In Example 15(a) through (i) is was observed after 4 days that the growth of the sprouts was stunted.

After an additional day the following results were noted.

(a) The sprouts were fat, 1.75 to 2 inches long. There was a fairly long single root which breaks off easily. 90% of the sprouts floated.

(b) The sprouts were slightly shorter than (a) but had the same root.

(c) The sprouts were shorter and fatter than (a) and (b), about 1.25 to 1.5 inches. The root was shorter, only ⅔ floated.

(d) The sprouts were 1 inch longer and fatter than in (a) through (c). There was still considerable root growth.

(e) through (i) The sprouts were very fat and short. The root was about the same length as the sprouts. The sprouts became more stunted in progression from (e) to (i).

(j) The control was about 1.25 to 1.5 inches long, had no root and had a body slightly thinner than in Example 15(a).

EXAMPLE 16

50 pounds of mung bean seeds were soaked in 38 gallons of water containing 0.17 gram (7.5 p.p.m. based on the seeds) of p-chlorophenoxyacetic acid and the indicated amounts of Treflan E.C.

(a) 1.13 grams (50 p.p.m.)
(b) 2.26 grams (100 p.p.m.)
(c) 4.53 grams (200 p.p.m.)
(d) 6.79 grams (300 p.p.m.)
(e) none (control)

The sprouts obtained were harvested after 6 days and the following observations noted.

(a) The sprouts were fairly fat but not as good as (b) or (c).

(b) The sprouts were good and fat with a small top root.

(c) There were obtained very good fat sprouts.

(d) Growth was stunted indicating that the amount of Treflan E. C. employed was beyond the optimum.

(e) The sprouts were long and stringy with no roots.

The sprouts in (a), (b) and (c) were very good and floated. The sprouts in (d) were on the short side and ⅓ did not float.

EXAMPLE 16

In quality control tests wherein bean sprouts were grown in water containing 7.5 p.p.m. of p-chlorophenoxyacetic acid and 200 p.p.m. of trifluralin based on the weight of dry seed no trifluralin residue was found in the sprouts. The test was sensitive to 0.05 p.p.m. of trifluralin. No p-chlorophenoxyacetic acid was detected in the sprouts.

What is claimed is:

1. A process for producing shorter, fatter mung bean sprouts comprising treating the mung bean seeds before sprouting with sufficient of the compound $\alpha,\alpha,\alpha$-trifluoro-2,6-dinitro-N,N-dipropyl-p-toluidine to produce short, fat sprouts.

2. A process according to claim 1 wherein the trifluoro-dinitro-dipropyl-p-toluidine is applied in aqueous solution.

3. A process according to claim 1 wherein there is also added sufficient of the compound p-chlorophenoxy acetic acid to inhibit the growth of root hairs on the sprouts.

4. A process according to claim 3 wherein the compounds are applied in aqueous solution.

5. A process according to claim 4 wherein the trifluoro-dinitro-dipropyl-p-toluidine is applied at a rate of 2.2 to 30.9 ounces per 3000 to 3500 pounds of seed.

6. A process according to claim 5 wherein the p-chlorophenoxy acetic acid is applied in an amount of 7 to 11 grams per 3000 to 3500 pounds of seed.

7. A process according to claim 1 including the steps of sowing the seeds in water and allowing them to sprout to produce shorter, fatter sprouts than are produced in the absence of said trifluoro-dinitro-dipropyl toluidine.

8. A process according to claim 7 comprising adding sufficient p-chlorophenoxy acetic acid prior to sprouting to inhibit the growth of root hairs on the sprouts.

9. A process according to claim 8 wherein the trifluoro-dinitro-dipropyl p-toluidine is applied at a rate of 2.2 to 30.9 ounces per 3000 to 3500 pounds of seed.

10. A process according to claim 9 wherein the p-chlorophenoxy acetic acid is applied in an amount of 7 to 11 grams per 3000 to 3500 pounds of seed.

References Cited

UNITED STATES PATENTS

| | | | |
|---|---|---|---|
| 2,522,409 | 9/1950 | Stoller | 71—77 |
| 3,257,190 | 6/1966 | Soper | 71—121 |

JAMES O. THOMAS, JR., Primary Examiner

U.S. Cl. X.R.

71—77, 116, 121